United States Patent [19]
Ishikawa

[11] Patent Number: 6,010,407
[45] Date of Patent: Jan. 4, 2000

[54] FLEXIBLE SHAFT LINER ASSEMBLY AND TORQUE TRANSMITTING SHAFT

[75] Inventor: Yoshiaki Ishikawa, Higashiosaka, Japan

[73] Assignee: Taiseikozai Co., Ltd., Osaka-fu, Japan

[21] Appl. No.: 09/057,613

[22] Filed: Apr. 9, 1998

[30] Foreign Application Priority Data

Mar. 13, 1998 [JP] Japan ................... 10-062867

[51] Int. Cl.⁷ ........................................ F16C 1/06
[52] U.S. Cl. .................. 464/52; 464/180; 464/183; 56/12.6; 30/276
[58] Field of Search .................. 464/52, 170, 173, 464/179, 180, 181, 183; 30/276; 56/12.7

[56] References Cited

U.S. PATENT DOCUMENTS

| | | | |
|---|---|---|---|
| 1,481,078 | 1/1924 | Albertson | 464/52 |
| 2,090,174 | 8/1937 | Albright | 464/173 |
| 2,689,762 | 9/1954 | Krumm | 30/276 |
| 3,085,406 | 4/1963 | Hanebuth | 464/52 |
| 4,127,080 | 11/1978 | Lakiza et al. | 464/180 |
| 4,226,021 | 10/1980 | Hoff | 464/52 |
| 4,424,045 | 1/1984 | Kulischenko et al. | 464/52 |
| 4,759,128 | 7/1988 | Katoh et al. | 30/276 |
| 4,848,846 | 7/1989 | Yamada et al. | 30/276 |
| 4,953,294 | 9/1990 | Dohse | 30/276 |
| 5,175,932 | 1/1993 | Lange et al. | 30/276 |
| 5,364,307 | 11/1994 | Shaulis | 56/12.7 |
| 5,446,964 | 9/1995 | Woods et al. | 30/276 |
| 5,599,233 | 2/1997 | Shaulis | 56/12.7 |
| 5,695,404 | 12/1997 | Shaulis | 464/52 |
| 5,839,961 | 11/1998 | Andress | 464/180 |

*Primary Examiner*—Eileen Dunn Lillis
*Attorney, Agent, or Firm*—Evenson, McKeown, Edwards & Lenahan, PLLC

[57] ABSTRACT

A torque transmitting shaft of this invention is so constructed that a flexible shaft liner assembly is inserted in an external tube, and a flexible shaft is inserted in a flexible shaft liner. The flexible shaft liner has two groups of projecting portions extending in a longitudinal direction, one-group projecting portions extend consecutively in the longitudinal direction, and the other-group projecting portions have notches at plural spots in the longitudinal direction. Vibration-proof rubbers fit in the notches, and the one-group projecting portions fit in grooves formed on inner faces of the vibration-proof rubbers. Outer faces of the vibration-proof rubbers contact with an inner face of the external tube so that the flexible shaft liner fits in the external tube.

2 Claims, 5 Drawing Sheets

FLEXIBLE SHAFT LINER ASSEMBLY AND TORQUE TRANSMITTING SHAFT

BACKGROUND OF THE INVENTION

This invention relates to a flexible shaft liner assembly for holding a flexible shaft rotatably in its inside and a torque transmitting shaft for transmitting a torque of an engine etc. by the flexible shaft to a rotating body such as a cutter blade etc.

Generally, the torque transmitting shaft is constructed in such a way that a flexible shaft liner is inserted in an external tube and the flexible shaft is inserted in the flexible shaft liner. In the torque transmitting shaft using the flexible shaft, however, occurrence of vibration caused by rotation of the flexible shaft has become serious trouble. In a mowing machine, for example, the vibration has reached hands operating the machine to make the operation impossible. For this reason, torque transmitting shafts illustrated in FIG. 15 and FIG. 16 have been proposed in order to solve such the trouble. FIG. 15 and FIG. 16 are partially exploded oblique views of conventional torque transmitting shafts respectively.

In the torque transmitting shaft of FIG. 15, plural tubular thick vibration-proof rubbers 18 fitted onto a tubular flexible shaft liner 17 are fitted in an external tube 11, so that the liner is held by the external tube 11. The vibration-proof rubber 18 is a component for preventing the vibration caused by rotation of the flexible shaft 13 from transmitting to the external tube 11 through the flexible shaft liner 17. Therefore, the vibration-proof rubbers 18 are installed at positions where vibration-proof effect is obtained most efficiently in a longitudinal direction of the flexible shaft liner 17. The vibration-proof rubbers 18 are secured to the flexible shaft liner 17 by bonding agent coated on inside surfaces of these rubbers.

However, the example of FIG. 15 has included such problems as follows. The flexible shaft liner 17 is generally made of 6,6-nylon, and this 6,6-nylon refuses the bonding agent, so that the vibration-proof rubber 18 can not be secured to the flexible shaft liner 17 firmly. For this reason, when the flexible shaft liner 17 fitted with the vibration-proof rubber 18 is inserted in the external tube 11, the vibration-proof rubbers 18 get out of respective previously specified positions, so that a desired vibration-proof effect can not be obtained. In addition, a bonding work of the vibration-proof rubber 18 has been troublesome and a workability of manufacture has been worse.

In the torque transmitting shaft of FIG. 16, a flexible shaft liner 19 is directly installed in the external tube 11 through plural projecting portions 191 formed on an outer surface of the liner.

However, the example of FIG. 16 has included such problems as follows. Since the flexible shaft liner 19 is hard because it is made of 6,6-nylon, almost all vibrations of the flexible shaft 13 are transmitted as they are to the external tube 11 through the flexible shaft liner 19, so that the vibration-proof effect has been nearly lost. In addition, it is impossible to fabricate the flexible shaft liner 19 just to specified dimensions, so that the flexible shaft liner 19 is hard to be inserted in the external tube 11 when its overall dimensions are large and the flexible shaft liner 19 revolves together with the flexible shaft 13 when its overall dimensions are small. Therefore, a torque transmitting effect has become extremely worse.

BRIEF SUMMARY OF THE INVENTION

A first object of this invention is to provide a flexible shaft liner assembly which is able to prevent vibration caused by rotation of a flexible shaft from transmitting to others, to improve a workability of manufacture, and to reduce a production cost.

A second object of this invention is to provide a torque transmitting shaft which is able to prevent vibration caused by rotation of a flexible shaft from transmitting to hands etc. operating the torque transmitting shaft, to prevent a worsening of torque transmitting efficiency caused by rotation of the flexible shaft liner accompanied by the rotation of the flexible shaft, and to improve a workability of manufacture.

In order to accomplish the above-mentioned first object, the flexible shaft liner assembly of a first invention of this application is composed of a flexible shaft liner in which a flexible shaft is inserted, and tubular thick vibration-proof rubbers fitted at plural spots onto the flexible shaft liner in its longitudinal direction; the improvement wherein the flexible shaft liner has on its outer surface two groups of projecting portions extending in its longitudinal direction, one-group projecting portion extends in the longitudinal direction consecutively and the other-group projecting portions have notches at plural spots in the longitudinal direction, and a number of each group of projecting portions is one or larger, the vibration-proof rubbers fit in the notches of the foregoing other-group projecting portions and the foregoing one-group projecting portions fit in grooves formed on inner faces of the vibration-proof rubbers.

According to the flexible shaft liner assembly of the first invention, a vibration caused by rotation of the flexible shaft is prevented from transmitting to others by using the vibration-proof rubber.

The vibration-proof rubbers fit in the notches and are locked by the projecting portions onto which inside grooves fit, so that these rubbers are not required to be bonded to the flexible shaft liner. Therefore, an installation work of the vibration-proof rubber can be simplified and a workability of manufacture of the flexible shaft liner assembly can be improved.

The flexible shaft liner is applicable to external tubes having various inside diameters larger than an outside diameter of the flexible shaft liner by only changing vibration-proof rubber dimensions. Consequently, it is not required to manufacture various flexible shaft liners adaptable to respective external tube dimensions. Therefore, the flexible shaft liner assembly can be reduced in its production cost.

In order to accomplish the above-mentioned second object, a torque transmitting shaft of a second invention of this application comprises an external tube, a flexible shaft liner assembly fitted in the external tube, and a flexible shaft inserted in the flexible shaft liner, in which a torque is transmitted by rotation of the flexible shaft; the improvement wherein the flexible shaft liner assembly is composed of a flexible shaft liner in which a flexible shaft is inserted, and tubular thick vibration-proof rubbers fitted at plural spots onto the flexible shaft liner in its longitudinal direction, the flexible shaft liner has on its outer surface two groups of projecting portions extending in its longitudinal direction, one-group projecting portion extends in the longitudinal direction consecutively and the other-group projecting portions have notches at plural spots in the longitudinal direction, and a number of each group of projecting portions is one or larger, the vibration-proof rubbers fit in the notches of the foregoing other-group projecting portions and the foregoing one-group projecting portions fit in grooves formed on inner faces of the vibration-proof rubbers, and outer faces of the vibration-proof rubbers contact with an inner face of the external tube so that the flexible shaft liner fits in the external tube.

According to the torque transmitting shaft of the second invention, a vibration caused by rotation of the flexible shaft is prevented from transmitting to the external tube by using the vibration-proof rubbers of the flexible shaft liner assembly. Consequently, the vibration is prevented from transmitting to hands etc. operating the torque transmitting shaft so that a handling ability can be improved.

Since the positions of notches can be specified voluntarily and accurately in the flexible shaft liner, the vibration-proof rubbers can be installed in places positively where the vibration-proof effect is obtained most efficiently so that the most efficient vibration-proof effect can be obtained by the vibration-proof rubbers.

Further, since it is easy to fabricate the vibration-proof rubber to specified dimensions, the vibration-proof rubber can be fitted in the external tube securely, and the vibration-proof rubber can therefore be prevented from revolving in the external tube. Since the projecting portions fit in the internal grooves of the vibration-proof rubber, the flexible shaft liner is prevented from revolving relative to the vibration-proof rubber. Accordingly, the flexible shaft liner is prevented from revolving in the external tube. Therefore, the torque transmitting efficiency can be prevented from becoming worse, which will be caused by rotation of the flexible shaft liner accompanied by the rotation of the flexible shaft.

Moreover, since the flexible shaft liner is reinforced by the projecting portions, the flexible shaft liner assembly can be inserted in the external tube without accompanying any interruption and trouble. Therefore, the workability of manufacture can be improved.

In addition, since the vibration-proof rubbers fit in the notches, the vibration-proof rubbers can be prevented from getting out of the places in the longitudinal direction of the flexible shaft liner when inserting the flexible shaft liner assembly in the external tube. Consequently, the vibration-proof rubbers can be installed in places where the vibration-proof effect can be obtained most efficiently, so that the most efficient vibration-proof effect can be obtained by the vibration-proof rubbers.

DETAILED DESCRIPTION OF THE INVENTION (Embodiment 1)

Figure 1:
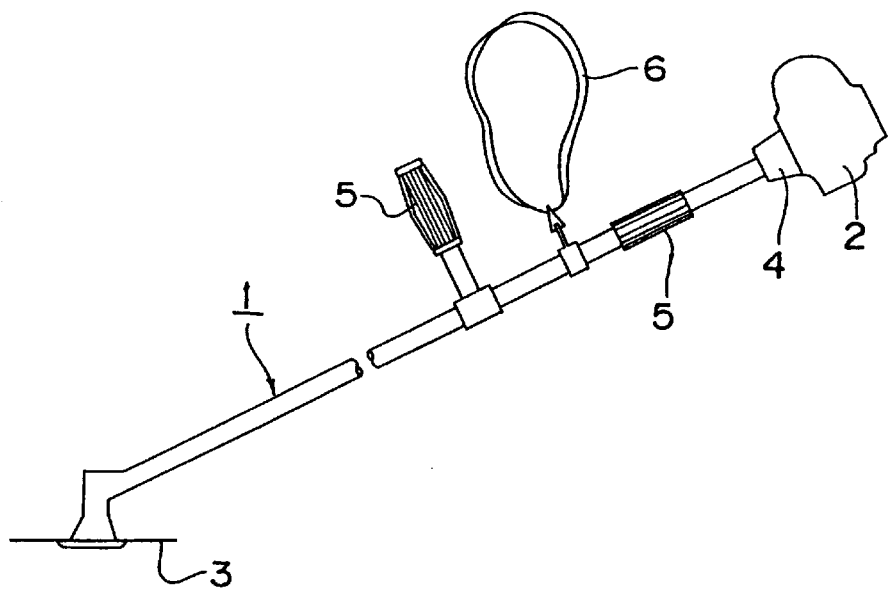
FIG. 1 is an oblique view of a shoulder-type portable mowing machine using a flexible shaft liner assembly or a torque transmitting shaft.

FIG. 1 is an oblique view of a shoulder-type portable mowing machine using a flexible shaft liner assembly or a torque transmitting shaft. In this mowing machine, a straight torque transmitting shaft 1 is used. It goes without saying that the torque transmitting shaft may be formed into a curved structure. An engine 2 is connected to a rear end of the torque transmitting shaft 1 through a clutch 4, and a cutting blade 3 is supported at its front end. A grip 5 and a shoulder band 6 are attached to the torque transmitting shaft 1

Figure 2:
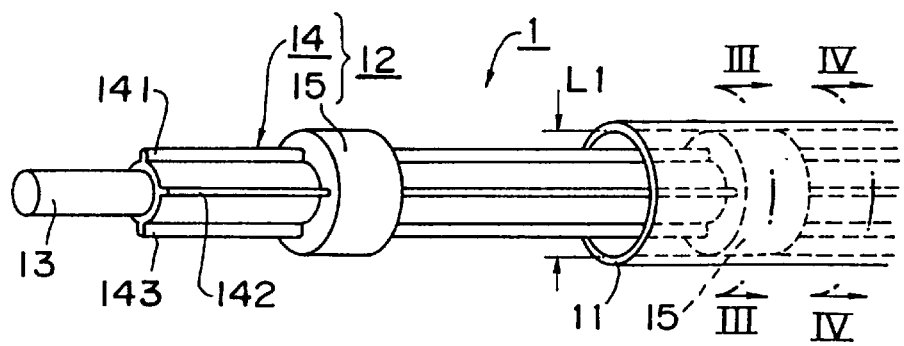
FIG. 2 is an oblique exploded partial view of a torque transmitting shaft of embodiment 1 of this invention.
Figure 3:
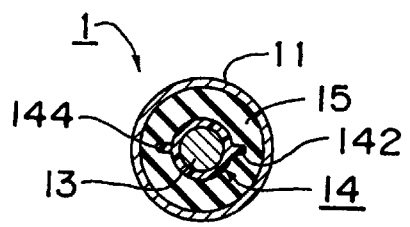
FIG. 3 is a sectional view taken on a line III—III of FIG. 2.
Figure 4:
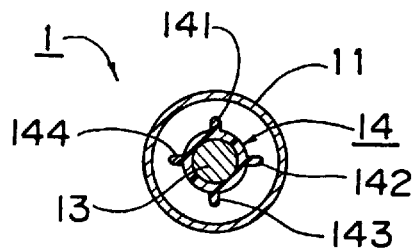
FIG. 4 is a sectional view taken on a line IV—IV of FIG. 2.

FIG. 2 is an oblique exploded partial view of the torque transmitting shaft 1, FIG. 3 is a sectional view taken on a line III—III of FIG. 2, and FIG. 4 is a sectional view taken on a line IV—IV of FIG. 2. The torque transmitting shaft 1 has a triple structure comprising an external tube 11 made of iron and aluminum etc., a flexible shaft liner assembly 12 inserted in the external tube 11, and a flexible shaft 13 inserted in the flexible shaft liner assembly 12. The torque transmitting shaft 1 is so constructed that a torque of the engine 2 is transmitted to the cutting blade 3 through means of rotation of the flexible shaft 13.

The flexible shaft liner assembly 12 is composed of a flexible shaft liner 14 and plural vibration-proof rubbers 15 fitted onto it. Outer faces of the vibration-proof rubbers 15 contact with an inner face of the external tube 11, so that the flexible shaft liner assembly 12 fits in the external tube 11. The flexible shaft 13 is inserted in the flexible shaft liner 14. The flexible shaft liner 14 is made of 6,6-nylon for example.

Figure 5:
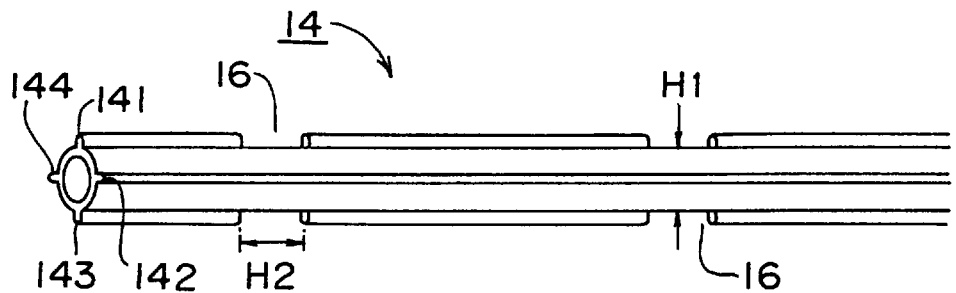
FIG. 5 is an oblique partial view of a flexible shaft liner of embodiment 1.

The flexible shaft liner 14 has on its outer surface four projecting portions 141, 142, 143 & 144 extending in its longitudinal direction as illustrated in FIG. 5. These four projecting portions are so constructed as to protrude by same heights with same spaces left in a circumferential direction. The projecting portions 142 & 144 extend consecutively in the longitudinal direction and the projecting portions 141 & 143 have notches 16 in which the vibration-proof rubbers 15 fit at plural spots in the longitudinal direction. In other words, the four projecting portions are classified into two kinds: that having the notches 16 and that not having the notches. The notches 16 are formed at positions where the vibration-proof effect created by the vibration-proof rubbers 15 can be obtained most efficiently.

Figure 6:
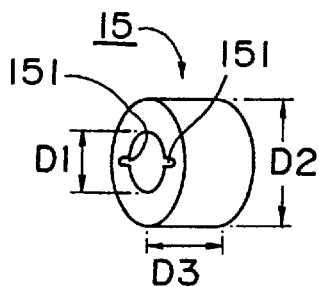
FIG. 6 is an oblique view of a vibration-proof rubber of embodiment 1.
Figure 7:
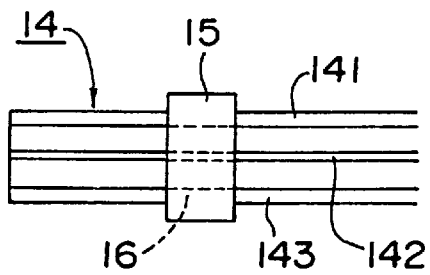
FIG. 7 is a side partial view of a state where the vibration-proof rubber is fitted onto the flexible shaft liner.

The vibration-proof rubber 15 is formed into a thick tubular shape as illustrated in FIG. 6. In the vibration-proof rubber 15, an inside diameter D1 is set equal to an outside diameter H1 (FIG. 5) of a tubular portion of the flexible shaft liner 14, an outside diameter D2 is set equal to an inside diameter L1 (FIG. 2) of the external tube 11, and a length D3 is set equal to a length H2 (FIG. 5) of the notch 16. Grooves 151 in which the projecting portions 142 & 144 fit when the vibration-proof rubbers 15 fit in the notches 16, are formed on the inner face of the vibration-proof rubber 15. FIG. 7 is a side partial view showing a state where the vibration-proof rubber 15 fits onto the flexible shaft liner 14. As illustrated in FIG. 7, the vibration-proof rubber 15 fits in the notch 16.

Figure 8:
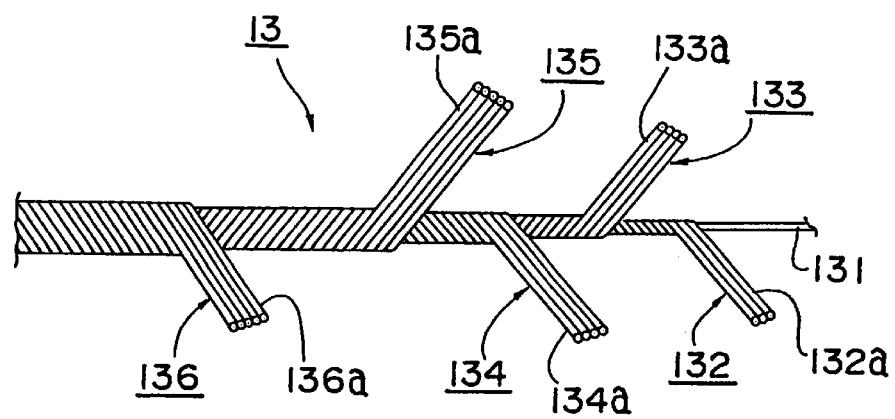
FIG. 8 is an exploded side partial view of a flexible shaft of embodiment 1.

The flexible shaft described in U. S. Pat. No. 5,288,270 applied by the applicant of this invention is preferably used for the flexible shaft 13. In concrete, the flexible shaft 13 is composed of a core wire 131 having a circular section and made of steel, and first to fifth element wire groups 132, 133, 134, 135 & 136 wound spirally around the core wire 131 by turns in reverse directions to form five layers as shown by FIG. 8. The element wire group is composed of element wires closely adhered each other into band shape. An element wire 132a of the first element wire group 132 is made of hemp yarn, and the element wires 133a, 134a, 135a & 136a of the second to fifth element wire groups are made of steel. The element wire 132a of the first element wire group 132 is impregnated with lubricant. The lubricant is filled, by means of a vacuum impregnation method, in gaps between the element wires, gaps between the element wire groups and gaps between the core wire 131 and the first element wire group 132. This filled lubricant has a viscosity larger than that of lubricant before being filled. The number of layer created by the element wire groups is not necessarily limited to five, but may be three, four, or six or larger.

The torque transmitting shaft 1 having the foregoing structure is manufactured as follows. In the first stage, portions corresponding to the notches 16 of the projecting portions are cut by a cutting machine while extruding the shaft liner by an extruder. Thus, the flexible shaft liner 14 is manufactured. In the next stage, the vibration-proof rubber 15 is widened a little and fitted onto the flexible shaft liner 14, and pushed up to a position of the notch 16 under this state. Thus, the vibration-proof rubber 15 is installed to the flexible shaft liner 14. Thereby, the flexible shaft liner assembly 12 can be manufactured. The flexible shaft liner assembly 12 is inserted into the external tube 11, and the flexible shaft 13 is inserted into the flexible shaft liner 14.

In the above-mentioned manufacturing work, the insertion work of the flexible shaft liner assembly 12 into external tube 11 can be carried out without accompanying any trouble such as clogging or blocking, because the flexible shaft liner 14 is reinforced by the four projecting portions 141, 142, 143 & 144.

Since the vibration-proof rubbers 15 fit in the notches 16, there is no chance for the vibration-proof rubbers 15 to get out of respective places in the longitudinal direction of the flexible shaft liner 14 when inserting the flexible shaft liner assembly 12 into the external tube 11.

The vibration-proof rubbers 15 are prevented from getting out of the places in the longitudinal direction of the flexible shaft liner 14 because they fit onto the notches 16. The vibration-proof rubbers 15 are prevented from getting out of the places in the circumferential direction of the flexible shaft liner 14 because the inside grooves 151 fit onto the projecting portions 142 & 144. Therefore, the vibration-proof rubbers 15 are not required to be bonded to the flexible shaft liner 14 by using a bonding agent. Accordingly, the installation work of the vibration-proof rubbers 15 to the flexible shaft liner 14 can be simplified and the workability of manufacture of the flexible shaft liner assembly 12 can be improved.

In the torque transmitting shaft 1 having the above-mentioned structure, the vibration caused by rotation of the flexible shaft 13 is absorbed by the vibration-proof rubbers 15 and not transmitted to the external tube 11. Therefore, in the mowing machine of FIG. 1, the vibration is not transmitted to hands operating the machine and the operation becomes easy.

Since the positions of notches 16 can be set voluntarily and accurately in the flexible shaft liner 14, the vibration-proof rubbers 15 can be securely installed in places efficiently where the vibration-proof effect is obtained most efficiently. Accordingly, the most efficient vibration-proof effect can be obtained by the vibration-proof rubbers 15.

Further, since it is easy to fabricate the vibration-proof rubber 15 just into specified dimensions, the vibration-proof rubber 15 can be formed to a dimension fitting in the external tube 11 accurately. Therefore, there is no chance for the vibration-proof rubber 15 to revolve in the external tube 11. Since the projecting portions 142 & 144 fit in the inside grooves 151 of the vibration-proof rubber 15, there is no chance for the flexible shaft liner 14 to revolve relative to the vibration-proof rubber 15. Accordingly, there is no chance for the flexible shaft liner 14 to revolve in the external tube 11. Therefore, the torque transmitting efficiency can be prevented from becoming worse, which will be caused by rotation of the flexible shaft liner 14 accompanied by rotation of the flexible shaft 13.

In addition, the flexible shaft liner 14 is applicable to external tubes 11 having various inside diameters larger than the outside diameter of the flexible shaft liner 14 by only changing dimensions of vibration-proof rubber 15. Consequently, it is not required to manufacture various flexible shaft liners adaptable to dimensions of external tube 11. Therefore, the flexible shaft liner can be reduced in its production cost.

(Embodiment 2)

Figure 9:
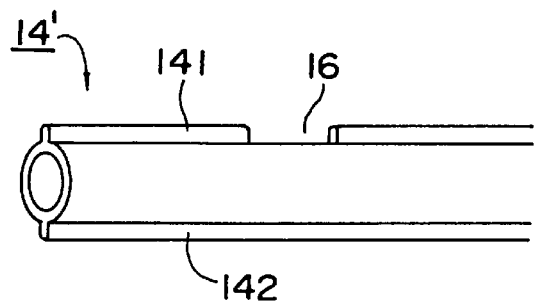
FIG. 9 is an oblique partial view of a flexible shaft liner of embodiment 2.
Figure 10:
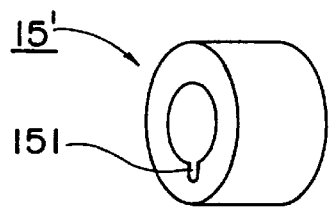
FIG. 10 is an oblique view of a vibration-proof rubber of embodiment 2.

A structure having two projecting portions 141 & 142, as illustrated in FIG. 9, may be used for the flexible shaft liner 14'. The vibration-proof rubber 15 in this case includes one groove 151 as illustrated in FIG. 10.

Even by this structure, the vibration-proof rubber 15 can be prevented from getting out of places in both the longitudinal and circumferential directions of the flexible shaft liner 14'. Therefore, the same function and effect as those of the embodiment 1 can be obtained even by the flexible shaft liner 14' of FIG. 9 and the torque transmitting shaft using the vibration-proof rubber 15' of FIG. 10.

(Embodiment 3)

Figure 11:
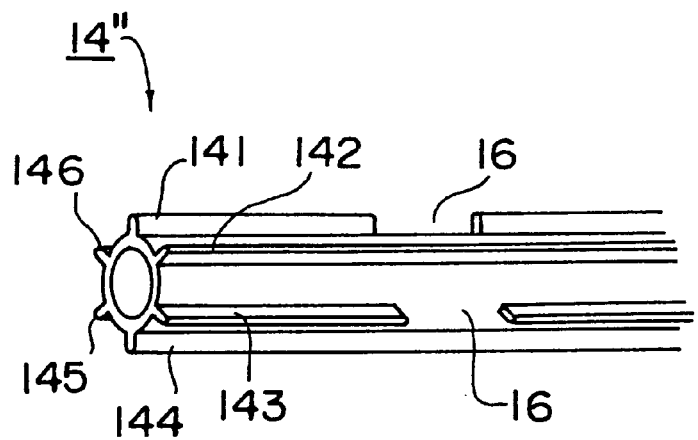
FIG. 11, is an oblique partial view of a flexible shaft liner of embodiment 3.
Figure 12:
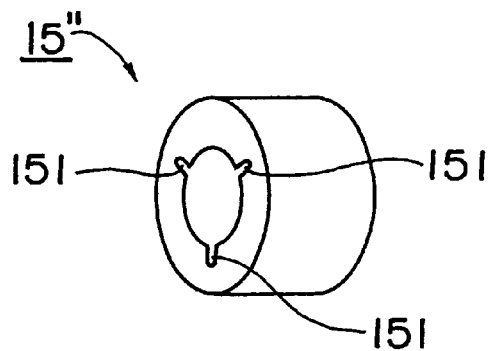
FIG. 12 is an oblique view of a vibration-proof rubber of embodiment 3.

A structure having six projecting portions 141, 142, 143, 144, 145 & 146 as illustrated in FIG. 11, may be used for the flexible shaft liner 14'. In this case, it is preferable to make the notches 16 on the projecting portions 141, 143 & 145. The vibration-proof rubber 15' used has a structure including three grooves 151 as shown by FIG. 12.

Even by this structure, the vibration-proof rubber 15' can be prevented from getting out of places in both the longitudinal and circumferential directions of the flexible shaft liner 14'. Therefore, the same function and effect as those of the embodiment 1 can be obtained even by the flexible shaft liner 14' of FIG. 11 and the torque transmitting shaft using the vibration-proof rubber 15' of FIG. 12.

(Embodiment 4)

Figure 13:
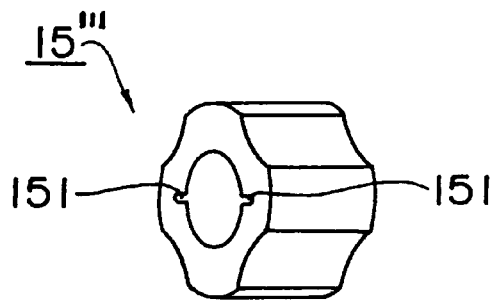
FIG. 13 is an oblique view of a vibration-proof rubber of embodiment 4.

An outer surface of the vibration-proof rubber 15' may be corrugated as shown by FIG. 13. According to this structure, it becomes easy to insert the flexible shaft liner assembly 12 into the external tube 11 because a contact area of the outer surface of the vibration-proof rubber 15' with the inner surface of the external tube 11 becomes small. Needless to say, the vibration-proof rubber 15' does not revolve relative to the external tube 11. Even by the torque transmitting shaft using this vibration-proof rubber 15', the same function and effect as those of the embodiment 1 can be obtained.

(Another embodiment)

For the projecting portions formed on the flexible shaft liner 14', any quality will do provided that it is two or larger.

However, two kinds of projecting portions are required: those including and not including the notch 16.

Figure 14:
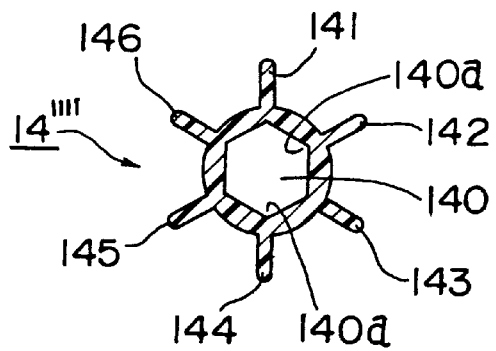
FIG. 14 is a sectional view of a flexible shaft liner of another embodiment.
Figure 15:
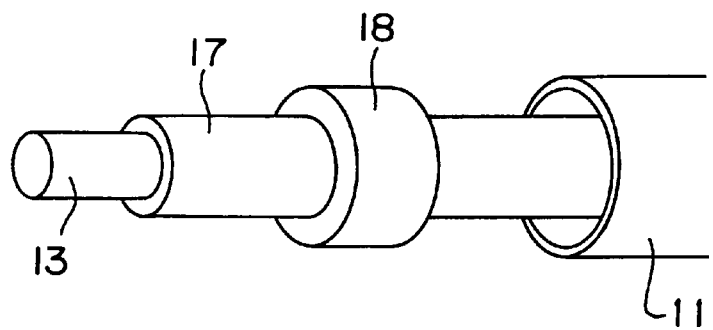
FIG. 15 is an exploded oblique partial view of a conventional torque transmitting shaft.
Figure 16:
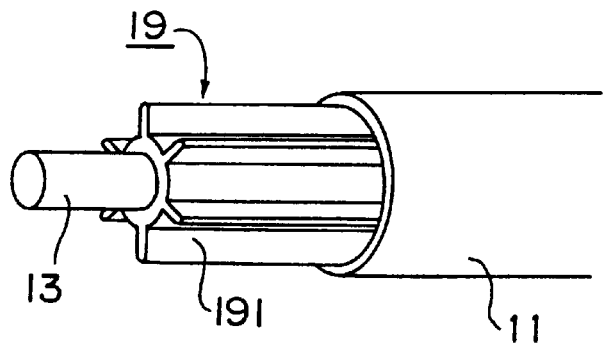
FIG. 16 is an exploded oblique partial view of a further another conventional torque transmitting shaft.

A sectional shape of an inside space 140 of the flexible shaft liner 14' into which the flexible shaft 13 is inserted is not limited to the circular shape, but may be a polygon such as a hexagon and an octagon etc. The sectional shape, for example, may be a hexagon illustrated in FIG. 14. According to this shape, a smooth rotation of the flexible shaft 13 can be maintained because oil basins are formed on respective corners 140*a* of the inside space 140.

I claim:

1. A flexible shaft liner assembly comprising a flexible shaft liner in which a flexible shaft is inserted, and tubular thick vibration-proof rubbers fitted at plural spots onto the flexible shaft liner in the longitudinal direction;

the improvement wherein the flexible shaft liner has on the outer surface two groups of projecting portions extending in the longitudinal direction, one-group projecting portions extend in the longitudinal direction consecutively and the other-group projecting portions have notches at plural spots in the longitudinal direction, and a number of each group of projecting portions is one or larger, and the vibration-proof rubbers fit in the notches of the foregoing other-group projecting portions and the foregoing one-group projecting portions fit in grooves formed on inner faces of the vibration-proof rubbers.

2. A torque transmitting shaft comprising an external tube, a flexible shaft liner assembly fitted in the external tube, and a flexible shaft inserted in the flexible shaft liner, in which a torque is transmitted by rotation of the flexible shaft;

the improvement wherein the flexible shaft liner assembly is composed of the flexible shaft liner in which a flexible shaft is inserted, and tubular thick vibration-proof rubbers fitted at plural spots onto the flexible shaft liner in the longitudinal direction, the flexible shaft liner has on the outer surface two groups of projecting portions extending in the longitudinal direction, one-group projecting portions extend in the longitudinal direction consecutively and the other-group projecting portions have notches at plural spots in the longitudinal direction, and a number of each group of projecting portions is one or larger, the vibration-proof rubbers fit in the notches of the foregoing other-group projecting portions and the foregoing one-group projecting portions fit in grooves formed on inner faces of the vibration-proof rubbers, and outer faces of the vibration-proof rubbers contact with an inner face of the external tube so that the flexible shaft liner assembly fits in the external tube.

* * * * *